US011405941B2

United States Patent
Mehta et al.

(10) Patent No.: US 11,405,941 B2
(45) Date of Patent: Aug. 2, 2022

(54) METHOD AND SYSTEM FOR TRAFFIC SHAPING AT THE DU/CU TO ARTIFICIALLY REDUCE THE TOTAL TRAFFIC LOAD ON THE RADIO RECEIVER SO THAT NOT ALL THE TTLS ARE CARRYING DATA

(71) Applicant: DISH Wireless L.L.C., Englewood, CO (US)

(72) Inventors: Dhaval Mehta, Englewood, CO (US); Amit Pathania, Englewood, CO (US)

(73) Assignee: DISH Wireless L.L.C, Englewood, CO (US)

( * ) Notice: Subject to any disclaimer, the term of this patent is extended or adjusted under 35 U.S.C. 154(b) by 0 days.

(21) Appl. No.: 16/945,131

(22) Filed: Jul. 31, 2020

(65) Prior Publication Data
US 2022/0039112 A1  Feb. 3, 2022

(51) Int. Cl.
*H04W 72/12* (2009.01)
*H04L 27/26* (2006.01)
(Continued)

(52) U.S. Cl.
CPC ..... *H04W 72/1252* (2013.01); *H04L 27/2608* (2013.01); *H04W 28/0289* (2013.01); *H04W 52/0206* (2013.01)

(58) Field of Classification Search
CPC .......... H04L 27/2608; H04W 72/1252; H04W 28/0289; H04W 52/0206
See application file for complete search history.

(56) References Cited

U.S. PATENT DOCUMENTS 7,164,667 B2   1/2007 Rayment et al.
10,470,120 B2  11/2019 Fischer
(Continued)

FOREIGN PATENT DOCUMENTS

WO   2020017941 A1   12/2014
WO   2019210946 A1   11/2019

OTHER PUBLICATIONS

5G Americas, "New services & applications with 5G ultra-reliable low latency communications", Nov. 2018. (Year: 2018).
(Continued)

*Primary Examiner* — Chi H Pham
*Assistant Examiner* — Weibin Huang
(74) *Attorney, Agent, or Firm* — KW Law, LLP

(57) ABSTRACT

Systems and methods are provided for adaptive channel and traffic shaping management in a network including configuring an element management control unit including a set of distribution (DU) and central units (DU/CU) for monitoring power and channel traffic at a plurality of cell sites in a network; transmitting and receiving by a scheduler unit, data traffic data of user equipment (UE); receiving control data, by the scheduler unit, about congested network channels in Uplink (UL) and downlink (DL) transmissions from the UE; applying channel management solutions, by the scheduler unit, at a cell site to choke off congested channels via a schedule schema based on the control data about the traffic amounts on a channel; applying, by a control unit coupled to the scheduler unit to manage network traffic at the cell site, adaptive traffic management solutions to shape network data traffic on select channels based on the control data of traffic type on the channel; and iteratively applying, by the control unit, the channel and traffic management solutions at the cell site based on data received by the DU/CU of the power and channel traffic condition.

20 Claims, 6 Drawing Sheets

(51) Int. Cl.
*H04W 52/02* (2009.01)
*H04W 28/02* (2009.01)

(56) References Cited

U.S. PATENT DOCUMENTS

| | | | |
|---|---|---|---|
| 10,523,914 B1 | 12/2019 | Phillips et al. | |
| 10,868,471 B2 | 12/2020 | Fischer | |
| 2006/0182262 A1 | 8/2006 | Goldman et al. | |
| 2008/0247760 A1 | 10/2008 | Edmon et al. | |
| 2010/0009694 A1 | 1/2010 | Fischer | |
| 2011/0034196 A1* | 2/2011 | Jonishi | H04W 24/02 455/509 |
| 2013/0094451 A1 | 4/2013 | Pavlovski et al. | |
| 2013/0169042 A1 | 7/2013 | Melamed | |
| 2014/0128073 A1 | 5/2014 | Farhadi | |
| 2014/0293777 A1 | 10/2014 | Dhillon et al. | |
| 2014/0357259 A1 | 12/2014 | Tomeczko et al. | |
| 2015/0023163 A1 | 1/2015 | Gonzalez et al. | |
| 2015/0172115 A1 | 6/2015 | Nguyen et al. | |
| 2017/0054595 A1 | 2/2017 | Zhang et al. | |
| 2017/0078209 A1* | 3/2017 | Miklos | H04W 28/0284 |
| 2017/0201968 A1 | 7/2017 | Nam et al. | |
| 2017/0367022 A1* | 12/2017 | Chandrasekaran | H04W 36/22 |
| 2018/0206267 A1 | 7/2018 | Islam et al. | |
| 2019/0037409 A1 | 1/2019 | Wang et al. | |
| 2019/0053193 A1 | 2/2019 | Park et al. | |
| 2019/0082326 A1 | 3/2019 | Mathison et al. | |
| 2019/0089716 A1 | 3/2019 | Stocker | |
| 2019/0132857 A1 | 5/2019 | Babaei et al. | |
| 2019/0140904 A1 | 5/2019 | Huang et al. | |
| 2019/0182716 A1 | 6/2019 | Futaki et al. | |
| 2019/0182752 A1 | 6/2019 | Lou et al. | |
| 2019/0223055 A1* | 7/2019 | Bor Yaliniz | H04W 48/16 |
| 2019/0223093 A1 | 7/2019 | Watfa et al. | |
| 2019/0246420 A1 | 8/2019 | Park et al. | |
| 2019/0253230 A1 | 8/2019 | Loehr et al. | |
| 2019/0357260 A1 | 11/2019 | Cirik et al. | |
| 2019/0364492 A1* | 11/2019 | Azizi | H04W 48/16 |
| 2020/0059345 A1 | 2/2020 | Pelletier et al. | |
| 2020/0084107 A1 | 3/2020 | Li | |
| 2020/0169921 A1 | 5/2020 | Zhu et al. | |
| 2020/0170022 A1 | 5/2020 | Jones | |
| 2020/0221346 A1 | 7/2020 | Park et al. | |
| 2020/0229076 A1 | 7/2020 | Jin et al. | |
| 2020/0245233 A1 | 7/2020 | Qian et al. | |
| 2020/0304406 A1 | 9/2020 | Thubert et al. | |
| 2020/0344641 A1* | 10/2020 | Veggalam | H04W 28/0289 |
| 2020/0344695 A1 | 10/2020 | Wang et al. | |
| 2020/0382386 A1 | 12/2020 | Narendra et al. | |
| 2021/0037390 A1 | 2/2021 | Tofighbakhsh et al. | |
| 2021/0058473 A1 | 2/2021 | Yerli | |
| 2021/0067421 A1* | 3/2021 | Kidd | H04L 41/5025 |
| 2021/0068044 A1 | 3/2021 | Chan et al. | |
| 2021/0112565 A1 | 4/2021 | Bhaskaran et al. | |
| 2021/0136680 A1* | 5/2021 | Browne | H04L 41/5019 |
| 2021/0167930 A1 | 6/2021 | Jeon et al. | |
| 2021/0203468 A1 | 7/2021 | Yi et al. | |
| 2021/0219185 A1 | 7/2021 | Xin et al. | |
| 2021/0219222 A1 | 7/2021 | Jia et al. | |
| 2021/0235492 A1 | 7/2021 | Iyer et al. | |
| 2021/0243232 A1 | 8/2021 | Verma et al. | |
| 2021/0243673 A1 | 8/2021 | Miller et al. | |
| 2021/0243684 A1 | 8/2021 | Wang et al. | |
| 2021/0266831 A1 | 8/2021 | Zhou et al. | |
| 2021/0314983 A1 | 10/2021 | Karaki et al. | |
| 2021/0329666 A1 | 10/2021 | Ljung et al. | |

OTHER PUBLICATIONS

ISA-USPTO, International Search Report issued in IA No. PCT/US2021/035616, dated Aug. 30, 2021.

Park, J.H. et al. "A New Traffic Load based Cell Zooming Algorithm in Dense Small Cell Environments", IEEE, 2015, pp. 332-337.

ISA-USPTO, International Search Report issued in IA. No. PCT/US2021/039580 dated Jan. 10, 2022.

* cited by examiner

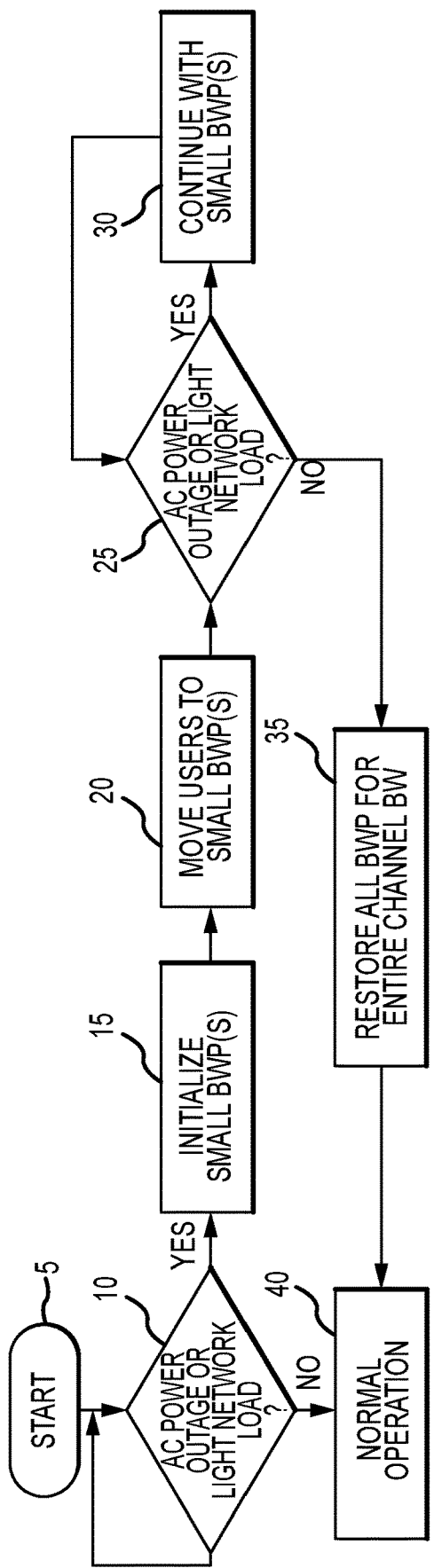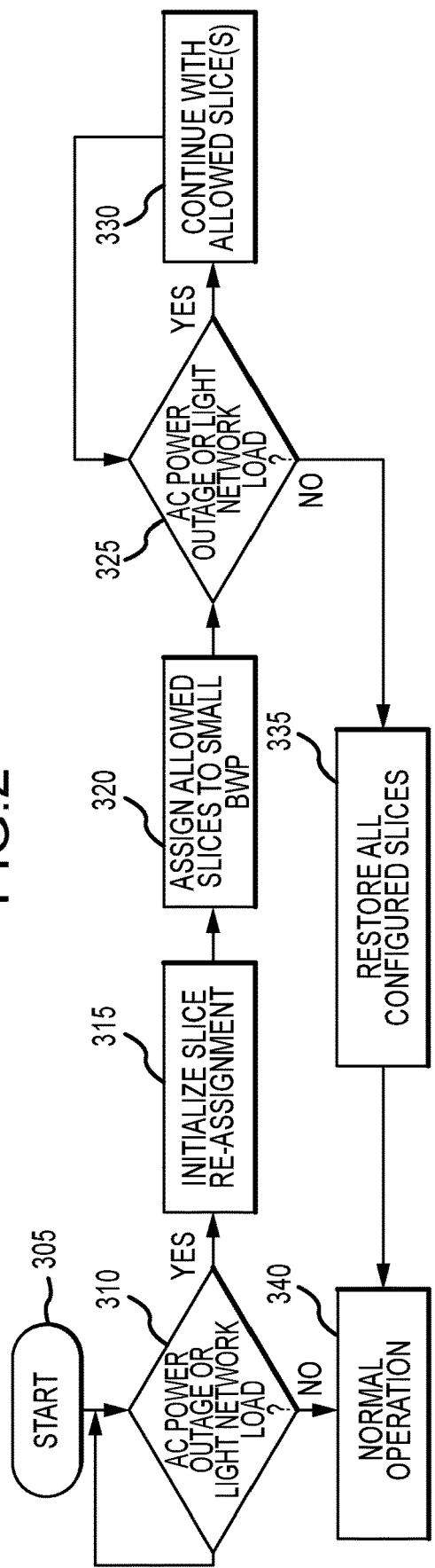

METHOD AND SYSTEM FOR TRAFFIC SHAPING AT THE DU/CU TO ARTIFICIALLY REDUCE THE TOTAL TRAFFIC LOAD ON THE RADIO RECEIVER SO THAT NOT ALL THE TTLS ARE CARRYING DATA

CROSS-REFERENCE TO RELATED APPLICATION

This application is related to United States Patent Application with Ser. No. 16/891,991, entitled METHOD AND SYSTEM FOR SLICING ASSIGNING FOR LOAD SHEDDING TO MINIMIZE POWER CONSUMPTION WHERE GNB IS CONTROLLED FOR SLICE ASSIGNMENTS FOR ENTERPRISE USERS filed on Jun. 3, 2020, and is related to the United States Patent Application with Ser. No. 16/891,934, entitled METHOD AND SYSTEM FOR SMART OPERATING BANDWIDTH ADAPTATION DURING AC POWER OUTAGES filed on Jun. 3, 2020. The content of both applications is incorporated by reference in their entirety.

TECHNICAL FIELD

The following discussion generally relates to power management in wireless communications systems. More particularly, the following discussion relates to systems, devices, and automated processes that reduce power drawn by radio frequency (RF) radios based on commercial power interrupts or failures in 5G data networks or the like by smart bandwidth adaptation and traffic loading increasing the operating time of the switched backup uninterruptible power supply (UPS).

BACKGROUND

The 5G data standard and telephone networks were developed to provide greatly improved bandwidth and quality of service to mobile telephones, computers, internet-of-things (IoT) devices, and the like. The high-bandwidth 5G networks, however, face additional challenges that are now being recognized. In part, because of the high-bandwidth, the 5G base station is expected to consume roughly three times as much power as the legacy 4G base stations in use. Further, more 5G base stations are needed to cover the same area as the legacy 4G base stations. Hence, not only does each 5G base consume three times the power of the 4G base station, for coverage of the same area more 5G base stations are in use, and as a result, significant increases in power consumption will result.

Further, along with the increases in power usage, in the case of AC power outages, the 5G base stations are required to have a battery backup to ensure service offerings during AC power outages. These battery backup units are expensive, and the cost for the battery backup is in part determined by the amount of the power needed and subsequently consumed by the RF radio transmitters and receivers at the 5G base station; which in this case exceeds the legacy 4G base stations by both number in use and the power need for each 5G base station. In these cases in which significant amounts of power are needed and consumed by certain 5G base stations, there is needed several serially or parallelly connected backup power packs that result in multiple fold cost increases in the eventual configured 5G base stations for each cell site.

The use of beam management is defined as the process of acquiring and maintaining a set of beams, which are originated at the gNB and/or the UE, and it is desirable to implement beam management to reduce power needs for the downlink and uplink transmission and reception.

It is desired to provide solutions to implement choking of heavily loaded channels as apposed to bandwidth reductions. It is desired to reduce power consumption at a cell site can be reduced by cutting off heavily loaded channels (i.e., limiting users); the power consumption saving can be shown in a functional relationship. That is, rather than apply traffic management to guarantee fairness amongst users, and traffic management solutions may be implemented that will take into account additional consideration amongst users to reduce power consumption incrementally for individual channels that can extend backup battery life with less power consumption.

It is, therefore, desirable to create systems, devices, and automated processes that can monitor commercial power interrupts and failures and allow different configurations of base station components to operate in the desired cell network. It is also desirable to improve connectivity and to the operating time for base station equipment operating in backup power modes using backup batteries at cell sites within 5G or similar networks.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein:

FIG. 2 illustrates an exemplary diagram of a feedback communication loop for power management of a base station responsive to a commercial power interrupt or failure of the base station power management system in a wireless data networking environment in accordance with various embodiments;

FIG. 3 illustrates an exemplary flowchart for power management of a base station responsive to a commercial power interrupt or failure of the base station power management system in accordance with various embodiments;

BRIEF SUMMARY

Figure 1:
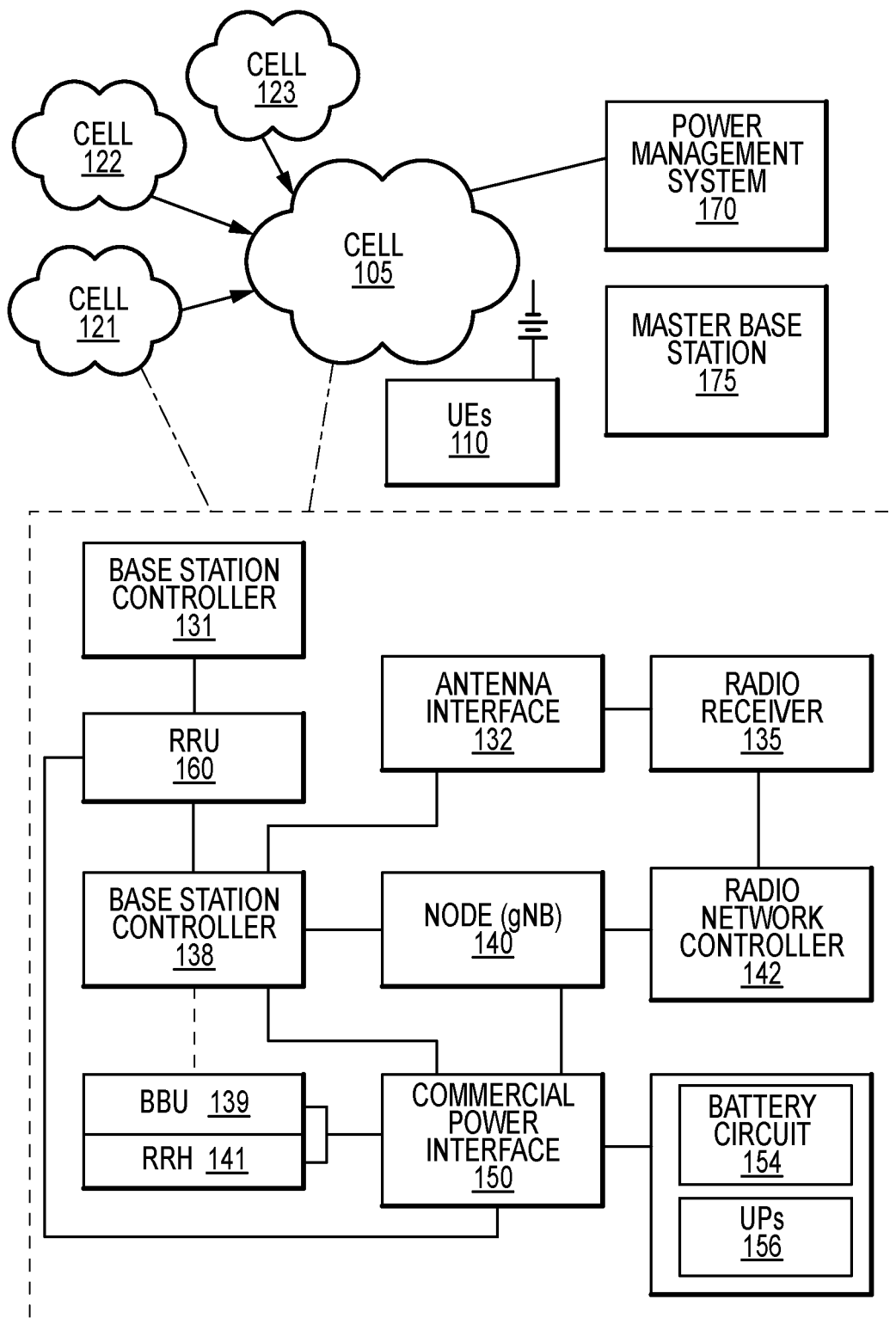
FIG. 1 illustrates an exemplary diagram of components in the adaptive channel selection and traffic shaping power management system in a wireless data networking environment in accordance with various embodiments.

Systems, devices, and automated processes are provided to reduce congested channels and adapt network traffic at a cell site to reduce the power draw of a backup power supply to the cell site in response to a power loss with/without channel congestion at the cell site.

In an exemplary embodiment, a system for adaptive channel and traffic shaping management in a network is provided. The system includes an element management control unit; a scheduler unit; a control unit; wherein the element management control unit including a set of distribution and central units (DU/CU) to monitor power and channel traffic conditions at a plurality of cell sites in the network; wherein the scheduler unit for transmitting and receiving data traffic data of user equipment (UE) configured to: receive a control data about congested network channels in Uplink (UL) and downlink (DL) transmissions from the UE; and apply channel management solutions at a cell site to choke off congested channels via a schedule schema based on the control data about traffic data amounts on a channel; wherein the control unit coupled to the scheduler unit to manage network traffic at the cell site, and configured to: apply adaptive traffic management solutions to shape network data traffic on select channels based on a control data of traffic type on the channel; and iteratively apply the channel and traffic management solutions at the cell site based on data received by the DU/CU of the power and channel traffic condition.

In various exemplary embodiments, the system further including: the control unit to apply adaptive beam management solutions to reduce power at the cell site, the control unit configured to: dynamically configure setting for power supplied for beam configurations used for UL and DL transmissions at the cell site to maintain current levels of beam signals across the cell site while reducing power consumed at cell sites of the network. The system further including: the scheduler unit to implement a time-domain based schedule to reduce power consumption in the UI, and DI: transmissions by reducing amounts of network traffic by applying a set of time-domain scheduling periods for scheduling of the network traffic on the channel. The system further including the scheduler unit configured to use a certain number of OFDM symbols to manage network traffic on congested channels by enabling a dynamic set of mini-slots to send and receive data requests in scheduled operations. The system further including the control unit configured to maintain the same active bandwidth prior to a power outage for select channels not subject to choke operations at the cell site. The reduced traffic includes mini-slot length for a mini-slot configuration period of UL and DL transmissions includes 2, 4, and S OFDM symbols. The system includes the scheduler unit configured to support low latency and reduced power consumption for each reduced traffic transmission by enabling UL and DL transmissions over variable periods of traffic data sub-frames of each mini-slot based on a set of frequencies wherein a traffic data sub-frame is a fraction of a series of packet data transmitted in a slot. The system includes the control unit configured to enable power management by performing one or more actions of a set, including choking congested channels, adapting beam management, and filtering network traffic at the cell site. The system includes in response to ongoing traffic transmissions, the scheduler unit configured to preempt an already ongoing sub-frame data-based transmission for other UEs to enable immediate transmission of sub-frame data at low latency on less congested channels to decrease amounts of power drawn. The system includes in response to power detected, the control unit restoring in a priority scheme choked channels and traffic shaped by control and filtering actions.

In another exemplary embodiment, a method for adaptive channel and traffic shape management is provided. The method includes configuring an element management control unit including a set of distribution (DU) and central units (DU/CU) for monitoring power and channel traffic at a plurality of cell sites in a network; transmitting and receiving by a scheduler unit, data traffic data of user equipment (UE); receiving control data, by the scheduler unit, about congested network channels in Uplink (UL) and downlink (DL) transmissions from the UE; applying channel management solutions, by the scheduler unit, at a cell site to choke off congested channels via a schedule schema based on a control data about traffic data amounts on a channel; applying, by a control unit coupled to the scheduler unit to manage network traffic at the cell site, adaptive traffic management solutions to shape network data traffic on select channels based on a control data of traffic type on the channel; and iteratively applying, by the control unit, the channel and traffic management solutions at the cell site based on data received by the DU/CU of the power and channel traffic condition.

In various exemplary embodiments, the method includes applying, by the control unit, adaptive beam management solutions to reduce power at the cell site, dynamically configure setting for power supplied for beam configurations used for UL and DL transmissions at the cell site to maintain current levels of beam signals across the cell site while reducing power consumed at cell sites of the network. The method further includes implementing by the scheduler unit a time-domain based schedule to reduce power consumption in the UL and DL transmissions and reducing amounts of network traffic by applying a set of time-domain scheduling periods for scheduling of the network traffic in a channel. The method includes using the scheduler unit, a certain number of Orthogonal Frequency-Division Multiplexing (OFDM) symbols for enabling mini-slots composed of sub-frame data when implementing send and receive data requests in scheduling operations. The method further including: maintaining by the control unit the same active bandwidth prior to a power outage for select channels not subject to choke operations at the cell site. The mini-slot length for a mini-slot configuration period of lit and DL transmissions includes 2, 4, and 8 OFDM symbols. The method includes supporting, by the scheduler unit, low latency and reduced power consumption for each reduced traffic transmission by enabling UL and DL transmissions over variable periods of traffic data sub-frames of each mini-slot based on a set of frequencies wherein a traffic data sub-frame is a fraction of a series of packet data transmitted in a slot. The method further including: in response to a DL transmission, preventing by the scheduler unit enabling of at least one mini-slots to receive DL transmissions outside an active bandwidth part; and in response to a UL transmission, preventing by the scheduler unit, enabling of at least one mini-slot to receive UL transmissions outside the active bandwidth part. The method further includes enabling power management by the control unit by performing one or more actions of a set, including choking congested channels, adapting beam management, and filtering network traffic at the cell site.

In yet another exemplary embodiment, a computer program product tangibly embodied in a computer-readable storage device that stores a set of instructions that when executed by a processor perform a method for an operational mode of a base station when a power loss with congested traffic in channels are detected, the method including: configuring an element management control unit including a set of distribution (DU) and central units (DU/CU) for monitoring power and channel traffic at a plurality of cell sites in a network; transmitting and receiving by a scheduler unit, data traffic data of user equipment (UE); receiving control data, by the scheduler unit, about congested network channels in Uplink (UL) and downlink (DL) transmissions from the UE; applying channel management solutions, by the scheduler unit, at a cell site to choke off congested channels via a schedule schema based on a control data about traffic data amounts on a channel; applying, by a control unit coupled to the scheduler unit to manage network traffic at the cell site, adaptive traffic management solutions to shape network data traffic on select channels based on a control data of traffic type on the channel; and iteratively applying, by the control unit, the channel and traffic management solutions at the cell site based on data received by the DU/CU of the power and channel traffic condition.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

When connecting a 5G base station to the power grid, this does not always guarantee that power is available and provided to the 5G base continuously all the time without interruption because of a plethora of environmental and operating reasons such as accidents, lightning strikes, rolling blackouts, etc. Therefore, for a robust and reliable 5G service made available from a 5G base station, carriers have to build in a backup power system. It is the norm to provide backup power to the macrocells in a 5G network, and often the macro level has sufficient service. However, the power-consuming small cell structure requires added power backup that is not usually available in legacy 4G cell tower power deployments. Hence, added backup power is essential to enable the proper functioning of the small cell rollout.

In 5G networks, the RF radio units are required to have a battery backup to ensure service offerings during an AC power outage. The battery backup units are expensive, and the cost for each battery backup is calculated by the power consumed by the radio unit, the backup duration, and how many operating carriers are at a base station or network.

Currently, there are a number of obstacles or drawbacks that prevent optimization of battery backup capacity when a power interrupt or outage occurs. It is a desire that the required battery backup capacity can be optimized as follows:

(1) Shut down Operating carriers: this is not a preferred option, as this impacts the user experience, lack of emergency calls, such as E911, resulting in users canceling their service and switching to operators who have battery backup services; (2) Reduce the operating carrier Bandwidth: this is not easily feasible in current operations as changing the operating carrier BW requires a new cell configuration on the same radio with lower channel BW, and (3) this will also cause service interruption as changing the operating BW will cause the site to restart for the new channel BW to be in effect.

The advanced capabilities of 5G small cells mean added power requirements. Increased data traffic requires more computational power. Although massive MIMO can help improve spectral efficiency, power efficiency is generally lower, and a typical three-sector small cell can require 200-1,000 watts of power.

There is a need to receive power by a large number of small cells in a cost-effective and repeatable way that supports fast and efficient rollouts. The first step involves recognizing that the traditional model for powering macro cell sites does not apply to small cells.

The A-frame has a duration of 10 ms, which consists of 10 subframes having 1 ms duration each similar to LTE technology. Each subframe can have $2\mu$ slots. Each slot consists of 14 Orthogonal frequency-division multiplexings (OFDM) symbols. The radio frame of 10 ms is transmitted continuously as per TDD topology one after the other. The subframe is of fixed duration (i.e., 1 ms), whereas slot length varies based on subcarrier spacing and number of slots per subframe. Each slot occupies either 14 OFDM symbols or 12 OFDM symbols based on normal Cyclic Prefix (CP) and extended CP, respectively.

The scheduler can be configured to reduce enabled slots (i.e., uplink or downlink), for example, implementing mini-slots that do not require all 14 symbols in a slot configuration for scheduling to manage power consumption without causing any cell site interruptions in service. Also, it is desirable to change the frequency in a time domain for scheduling as well the enabled/not enabled slots. The scheduler can implement scheduling based on the time domain, and the mini-slots are enabled or disabled to reduce the power requirements of all the operating carriers of cell sites in a network, particularly in case of an AC power outage or interruption for enhanced power management efficiencies of each cell site.

The channel control by a control unit can be defined as the Medium Access Control (MAC) Layer of NR that provides services to the Radio Link Control (RLC) Layer in the form of logical channels. A logical channel is defined by the type of information carried and is a control channel when used for transmission of control and configuration information or is a traffic channel when used for the user data.

The channel control is configured into radio resources that are composed of two domains frequency and time. In the frequency domain, the channel bandwidth ranges from 1 to 20 MHz. The total available bandwidth which includes 1.4, 3, 5, 10, 15 and 20 MHz is divided into sub-channels of 12 sub-carriers of 15 KHz, totaling 180 KHz. The minimum allocation unit of radio resources is called Resource Block (RB). A single RB consists of 180 KHz in the frequency domain and 1 ms in the time domain. In the time domain, radio resources are divided into Transmission Time Intervals (TTI), also called sub-frame, with duration of 1 ms. One frame is formed by 10 TTI. Each TTI consists of two 0.5 ms slots, and each slot includes seven symbols. A LTE-A network within the 5G environment (i.e 5G LTE-A).

The mini-slot is a minimum scheduling unit used in 5G NR. It occupies 2, 4, or 7 OFDM symbols (regardless of numerology), so a user can be allocated a mini-slot, which is less than the slot (14 symbols), and it is suitable for low latency communication. It enables what is called non-slot based scheduling that will have higher priority than normal Enhanced Mobile Broadband (eMBB) user, so it can preempt other eMBB transmissions as it has requirements for lower latency.

The slot can be classified as downlink (all symbols are dedicated for downlink) or uplink (all symbols are dedicated for uplink) or mixed uplink and downlink transmissions. In the case of Frequency Division Duplex (FDD), all symbols within a slot for a downlink carrier are used for downlink transmissions and all symbols within a slot for an uplink carrier are used for uplink transmissions. New Radio (NR) Time Division Duplex (TDD) uses a flexible slot configuration. The OFDM symbols in a slot can be classified as 'downlink,' 'flexible,' or 'uplink.' Flexible symbols can be configured either for uplink or for downlink transmissions. NR TDD uses a flexible slot configuration. OFDM symbols in a slot can be classified as 'downlink', 'flexible', or 'uplink'. The flexible symbol can be configured either for uplink or for downlink transmissions. In FDD mode, both uplink and downlink can transmit at the same time at different spectrum frequencies. In TDD mode, both uplink and downlink use the same spectrum frequencies but at different times.

The MIMO antennas communicate with multiple users using focused beams of radio waves ("beamforming"). This increases channel efficiency along with data transfer rates and reduces the possibility of interference. Also, particular MIMO antenna configurations can be implemented to focus radio energy directly towards the connected device and can identify the exact amount of power and energy required to further reduce energy consumption for both the base station and the user equipment (UE).

Traffic shaping can reduce power consumption at a cell site (i.e., Base station). For example, Traffic shaping rules can be implemented to allow real-tinge voice and video and to block or throttle applications such as peer to peer applications, and social networks. When channels are not congested, the power consumption is reduced because of the low traffic rate. The same is not true for the case of high traffic load as the power consumption is not be reduced because, during high traffic loads, there are no empty subframes left. The user, when engaging in channel selection, can be moved to different channels. For example, users can be moved from a channel at 20 hz to a 40 Mhz channel or to another.

In 5G NR, beams based cell sector coverage is used, which increases the link budget and overcomes the disadvantages of the mm-wave channel. In other words, all the data transmissions and key signaling transmissions are beam-formed (directional).

The RF radios and antennas use a fixed input power that is based on full load RF conditions. When commercial power is interrupted, lost, or dramatically reduced, the RF radio is not able to receive notice to modulate its power consumption accordingly. In other words, the RF is not informed, nor is the RF radio configured to be advised of a commercial power loss and can change or drop its preconfigured input power requirements. The inability to change the input power requirements of the RF radio results in lower performance in its operation by causing a faster drain on its battery backup systems.

The 5G New Radio (NR) is the global standard for a unified, capable 5G wireless interface, can deliver a faster broadband experience, and is designed to have an initial bandwidth part (BWP) that is used by all the UE during initial access and dedicated BWP for a UE or group of UEs that will apply for data allocations. The BWP adaptation is controlled by a gNB node (radio access network (RAN)+ distributed unit (DU)/centralized unit (CU) for 5G). There can be multiple smaller BWP(s) that will be predefined by the operator to be used during AC power outages (i.e., a RAN slicing architecture that has multiple sets of functional splits and function placement in one cell). In an exemplary embodiment, another option is to use a gradual reduction in the operating BWP. For (e.g., to start with only a 25% percent reduction in BW and then gradually move to lower numbers if the power is not restored). With this process, the user experience can avoid degradation in the case of short AC power outages. The network slicing can also be linked to the BWP, during an AC power outage or light network load operations, the minimization of the power consumption gNB can be done by control of the slice and BWP mutual association. For example, the operator can choose to merge all the available slices into the smaller BWP. The operator can choose to define the BWP and slice mapping during an AC power outage when there are multiple BWP defined that are made available during AC power outages It is desirable to achieve cost savings using intelligent solutions to reduce the power consumption of 5G base stations when operating in a backup power mode while meeting sufficient regulatory operating requirements to prevent a shut-down of the radio transmitter.

It is desirable to limit the number of backup power supplies that are needed for use when operating the 5G base station in a backup power mode for component cost savings, current usage, and efficiency.

It is desirable to provide systems and methods for operating adaptive mini-slot management to monitor power and channel traffic at a plurality of cell sites in the network; to enable and disable a set of mini-slots in a downlink (DL) pattern and an uplink (UL) pattern including at least two concatenated patterns jointly repeated with periodicity in a slot configuration period for new radio (NR) communications by users at cell sites in the network; and in response to a request by a user, to reserve a number of mini-slots for use in each slot configuration period wherein a reserved slot number is responsive to at least one of a condition of an AC power outage, and reduced channel traffic based on data received by the DU/CU about the condition.

It is desirable to provide systems and methods initialize a set of mini-slots for use when scheduling the UE with by mini-slot assignments to dynamically inform the UE about a UL transmit and DL receive patterns for each mini-slot configuration period wherein an initial set of mini-slots are enabled in response to data received about a loss of power and to reduce channel traffic at mini-slots from the DU/CU monitoring cell sites of the network. Also, it is desirable to implement a time-domain based schedule to reduce power consumption in the UL and DL transmissions by reductions in slot time via changing a frequency of the mini-slot configuration period by applying a set of time-domain scheduling periods for a select number of mini-slots to be enabled in each time-domain scheduling period.

It is desirable to provide systems and method for operating management of base stations components that enable the smart management of power consumption by implementing adaptable bandwidth control and slice offering at cell sites (i.e., nodes) or enabling automated systems to reconfigure component based on examination of the current traffic loading on the antenna to change the mode of operation of the RF radio transmitter based on evaluating if a degraded RF radio service can be implemented under the current conditions. If it is possible, the RF EMS or orchestration system will execute a workflow to drop the input power requirements on the RF radio. This can reduce the current power draw that can result in increases in the amount of time the RF radios/antennas can operate in a backup UPS power mode and provide service.

It is desirable to implement processes where the operator can choose to close some slice offerings and continue only higher priority slice(s). The Radio AC power outage detection by DU/CU, DU/CU, or NFMF can also detect AC power outage via FCAPs and activate the solution. During an AC power outage, the RAN will notify to the control unit (DU: Distributed Unit or CU: Central Unit). The DU/CU will initiate moving of all user traffic to the designated lower BWP(s) (e.g., initial BWP) while shutting down all the other BWP in the current operating carrier. Based on the configuration, the DU/CU will move all the users and/or slices to the smaller BWP(s) during an AC power outage or during light network load to minimize power consumption gNB and will notify the users of the change in the assigned BWP. The Users will stop monitoring the current BWP and will immediately start following only the lower BWP.

In a multi-carrier operation, the DU/CU can also move all the traffic to a single carrier based on BWP or slice prioritization configurations. After full power restores or loading on the RAN has increased, gNB can re-activate all the dedicated BWP or slices and move the users seamlessly to their respective BWP or slice(s). The reduced bandwidth assignment to UE in Multi-User MIMO (MU-MIMO) operation. If the RAN Scheduler is operating in MU-MIMO operation and decides that all serving users can be assigned to the same lower PRBs, DU/CU can turn off transmission on other sub-carriers thereby resulting in power saving. The lower PRBs assignment for MU-MIMO can be prioritized based on BWP and/or Slicing predefined priorities.

It is desirable to change required levels on the input power setting of the RF radio in response to feedback messages of detected input commercial power level changes or interrupts by the RF radio to reduce the operating RF radio power consumption. The RF radio operating power setting is reduced based on the immediate operational requirements, including determinations of the available RF service on the antenna/radio to provide for a prolonged operating time of airtime of the antenna reception and RF radio transmitter.

It is desirable to enable automated systems to reconfigure components based on examination of the current traffic loading on the antenna to change the mode of operation of the RF radio transmitter based on evaluating if a degraded RF radio service can be implemented under the current conditions. If it is possible, the RF EMS or orchestration system will execute a workflow to drop the input power requirements on the RF radio. This can reduce the current power draw that can result in increases in the amount of time the RF radios/antennas can operate in a backup UPS power mode and provide service.

It is desirable to provide systems and methods that when the RF radio of the operating cell (i.e., gNB node) incurs a drop or interrupt of commercial power at the input to the base station the operational systems are altered to compensate for the loss of commercial power to a reduce RF radio current draw.

Wireless mobile communication technology uses various standards and protocols to transmit data between a base transceiver station (BTS) and a wireless mobile device. The deployment of a large number of small cells presents a need for energy efficiency power management solutions in fifth-generation (5G) cellular networks. While massive multiple-input multiple outputs (MIMO) will reduce the transmission power, it results in not only computational cost, but for the computation required, the input power requirements for transmission can be a significant factor for power energy efficiency (especially when operating in a backup mode) of 5G small cell networks. In 3GPP radio access networks (RANs) in LTE systems, the BTS can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

The power consumption of base stations (BSs) is classified into three types, which are the transmission power, the computational power, and power for base station operation. The transmission power is the power used by the power amplifiers (PAs) and RF chains, which perform the wireless signals change, i.e., signal transforming between the base-band signals and the wireless radio signals. The computation power represents the energy consumed at baseband units (BBU's), which includes digital single processing functions, management, and control functions for B Ss and the communication functions among the core network and BSs. All these operations are executed by software and realized at semiconductor chips. The additional power represents the power consumed for maintaining the operation of BSs. More specifically, the additional power includes the power lost at the exchange from the power grid to the main supply, at the exchange between different direct current to direct current (DC-DC) power supply, and the power consumed for active cooling at BSs.

Power loss and outages are commonplace in networks today as a result of natural disasters, rolling brownouts, etc. Base stations include backup power (e.g., batteries), these forms of backup power may not provide sufficient power during lengthy AC power outages, the use of commercial wireless communications services may increase due to users' needs and/or desires.

The physical or network node either represents an access node (e.g., Radio Distributed Units) or non-access node (e.g., servers and routers), while a physical link represents an optical fiber link between two physical nodes. Every physical node is characterized by a set of available resources, namely computation (CPU), memory (RAM), and storage, which define the load characteristics of a cell site. Each physical link is characterized by a bandwidth capacity and a latency value, which is the time needed by a flow to traverse that link. Finally, both physical nodes and links have associated utilization power requirements for each type of available resource.

The power delivery to a BS is rectified and regulated to a nominal measured DC voltage 48 (i.e., voltage direct current (VDC)), which is fed to a backup battery or a set of backup batteries for charging. The rectifier unit includes circuitry to keep the batteries fully charged and ready in case of a commercial power interrupt or failure. At full charge, the backup battery is kept at a voltage in the vicinity of 50 volts. Also, the vendors/operators may opt for a DC voltage of −24V or other DC voltage setting and not the typical 48V setting. The battery pack parameter in general per customer's requirement is in the order of 2-hour work time or other operator backup time settings (e.g., the operators may choose a 2-hour battery backup, 4-hour or 8-hour . . . as desired or required for operations) under 100 W (in this case, the power is calculated per RU power consumption and is a variable quantity . . . ) AC system, 48.1V/65 Ah battery that can last for about 150 minutes with a full load.

Base stations typically use a 48V input supply that is stepped down by DC/DC converters to 24V or 12V, which can be reduced to meet the DC voltage level of each module.

In the 3GPP specification, the receive and transmit bandwidth of a UE can be adjusted to a subset of total cell bandwidth referred to as BWP. The bandwidth can be configured to shrink during a period of low activity for power reduction, and also the bandwidth location can be changed to allow different services. In an exemplary embodiment, the bandwidth adaption can be achieved by configuring the UE with BWP(s) informed to the UE of which of the configured BWPs is currently active one.

FIG. 1 shows a graphical representation of a 5G or other data network 100 that includes multiple cells 121, 122, 123 that provide access to a network 105 for any number of UE devices 110. Although FIG. 1 shows only one user equipment (UE) device 110 for simplicity, in practice the concepts described herein may be scaled to support environments 100 that include any number of devices 110 and/or cells 121-123, as well as any sort of network architecture for assigning bandwidth to different slices and performing other tasks, as desired.

In the example of FIG. 1, a mobile telephone or other user equipment (UE) device 110 suitably attempts to connect to network 105 via an appropriate access cell 121, 122, 123. In the illustrated example, each cell 121 includes the components for transmission of a base station controller 131, a base station transceiver 138, a node 140, an RF Radio 135, a Radio Network controller 142; the linking components of the antenna interface 132 and the antenna 133; and the power components of the commercial power interface 150, the backup power supply 152 of a battery circuitry 154 and UPS or batteries 156. The The commercial power interface 150 may receive power AC power from a public utility or other sources. The antenna 133 and antenna interface 132 control the signal to the UEs 110. The radio network controller 142 can control the RF transmit output via the RF radio 135 to conserve power usage to reduce the power draw on the USP 156. By reducing the communication bit rate, the RF power can be reduced in decibels ("dB"). Additionally, step reductions can be implemented. The battery circuit 154 can be configured as a rectifier type switch that can switch the output power from the UPS 156 at multiple levels. The Base Station controller 138 can include power control features to control the power drawn by the base station 138. Additionally, the base station controller 138 can communicate wirelessly with a power management system 170 that can confirm the AC power outage or interrupt on the front end to change the power input power levels of multiple small cells 121, 122, and 123, and a number of UEs 110 connected to the Node 140 and resources in a slice of a node (gNB).

In an exemplary embodiment, UEs 110 can be configured with a maximum of 4 BWP for Downlink and Uplink, but at a given point of time, only one BWP is active for downlink and one for uplink. The BWPs can be configured to enable each of the UEs 110 to operate in a narrow bandwidth, and when the user demands more data (bursty traffic), it can inform gNB to enable full bandwidth. When gNB configures a BWP, it includes parameters: BWP Numerology (u) BWP bandwidth size Frequency location (NR-ARFCN), CORE-SET (Control Resource Set). For Downlink, UE is not expected to receive PDSCH, PDCCH, CSI-RS, or TRS outside an active bandwidth part. Each DL BWP includes at least one CORESET with UE Specific Search Space (USS) while Primary carrier at least one of the configured DL BWPs includes one CORESET with common search space (CSS). For the uplink, UE 110 shall not transmit PUSCH or PUCCH outside an active bandwidth part. UEs 110 are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap In an exemplary embodiment, the radio network controller 131 can implement logic is implemented with computer-executable instructions stored in a memory, hard drive, or other non-transitory storage of device for execution by a processor contained within. Also, the radio network controller 131 can be configured with a remote radio unit (RRU) 160 for downlink and uplink channel processing. The RRU 160 can be configured to communicate with a baseband unit (BBU) 139 of a base station controller 131 via a physical communication link and communicate with a wireless mobile device via an air interface.

In various alternate embodiments, the base station 138 can be separated into two parts, the Baseband Unit (BBU) 139 and the Remote Radio Head (RRH) 141, that provides network operators to maintain or increase the number of network access points (RRHs) for the node (gNB), while centralizing the baseband processing functions at a master base station 175. Using a master C-RAN base station 175, the power management system, 170, can be instructed to coordinate operations in the tangent of power levels of multiple cells (121, 122, and 123).

FIG. 2 is an exemplary flow diagram of a smart bandwidth adaptation call flow of the smart bandwidth (BW) adapter controller in accordance with various embodiments. In FIG. 2, initially at step 5, the smart BW control is enabled or always configured in on-state monitoring for an AC power outage or light network load. At step 10, detection by the BW adapter controller is made as to whether a change in state is occurring of an AC power outage or light network load. For example, a feedback communication loop for power management of a base station responsive to a commercial power interrupt or failure of the base station power management system in a wireless data networking environment, or a New Radio AC power outage detection by distribution unit (DU) or central unit (CU) connected to the 5G network.

The Distributed Unit (DU) or Central Unit (CU) or management function (NFMF) can also detect AC power outage by using the network model of Fault, Configuration, Accounting, Performance, Security (FCAPS) and activate the appropriate solution. For example, during an AC power outage, the RF radio will notify to the control unit DU/CU and the DU/CU units will initiate moving of all or nearly all of the user traffic to the designated lower BWP(s) (e.g., initial BWP) while shutting down all or almost all of the other BWP in the current operating carrier.

Next, if there is determined that there is an AC power outage or light network load at the node, then at step 15, the small BWP(s) will be initialized. The initial active small BWP(s) are for a UE during the initial access until the UE is explicitly configured with BWPs during or after the establishment of the RRC connection. The initial active BWP is the default BWP unless configured otherwise.

At step 20, move or assigns users to small BWP(s). For example, based on the network configuration, the DU/CU may move all or nearly all the users and/or slices to the smaller BWP(s) during the AC power outage or during the light network load to minimize power consumption. The gNB will notify the UEs of the change in the assigned BWP. The UEs will cease to monitor the current BWP and will switch to immediately monitoring only the lower BWP. In a multi-carrier operation, the DU/CU can also move all the traffic to a single carrier based on BWP and/or slice prioritization configurations.

The reduction from a wider bandwidth has a direct impact on the peak, and users experienced data rates. By operating UEs with smaller BW than the configured CBW, it reduces power and still can allow support of the wideband operation. At step 25, the adaptive bandwidth module continues to monitor for an AC power outage or light network load if the commercial power is resumed then at step 35, the BWP is restoring for the entire channel. After full power restores or loading on the RAN has increased, gNB can re-activate all the dedicated BWP and/or slices and move the users seamlessly to their respective BWP and/or slice(s).

At step 40, the normal operation is resumed again, and the power consumption levels are raised. Alternately, at step 25, if there is still determined to be an AC power outage or light network load, then at step 30, the feedback operation occurs to delay restoring the normal operation with all the BWPs for the entire channel BW The node is still placed in a limited operational state configured with the small BWP(s), and the BW adaptive unit continues to wait for the resumption of the commercial power or increased loads.

The reduced bandwidth operations and the corresponding assignments to the UEs can also occur in a Multi-User MIMO (MU-MIMO) operation if a RAN Scheduler is operating in MU-MIMO operation and decides that all or nearly all of the current serving users can be assigned to the same lower physical resource blocks (PRBs). In this case, the DU/CU units can shut off the current transmission that is occurring on other sub-carriers (i.e., each PRB can consist of up to 12 subcarriers) which will also result in power savings of the BS The lower PRBs assignments for MU-MIMO can also be prioritized based on the BWPs active and/or the slicing priorities that have been predefined.

FIG. 3 is an exemplary flow diagram of a smart bandwidth adaptation call flow of the smart bandwidth (BW) adapter controller in accordance with various embodiments. In FIG. 3 at step 305, in the smart BW adaptation call-flow, like in FIG. 2, the BW adapter controller is initiated, and at step 310 determines whether a change in state is occurring of an AC power outage or light network load is being operated at the node. If the determination is in the affirmative, then at step 315, the initialize slice reassignment process takes place. At step 320, various slices are reassigned to small BWPs from their current slice assignments. The network slicing is configured that each active slice is tied to respective BWPs which enable during the AC power outage or light network load the systematic automated transfer of each active slice to a BWP in a scheduled order to reduce the power consumption by the UEs accessing the gNB by preconfigured slice control and BWP association For example, an operator can choose to merge all the active slices in the network or at a node into smaller BWPs. The operator may choose to define profiles, settings, etc. of each BWP that make up the BW and also alternative slice mappings for assignment during the power interrupt, AC power outage, light network load, etc. and this can be beneficial when there are multiple BWP that can be defined for usage in such conditions when the full BW is not needed or when power savings are desired. The offering or selections can be assigned all at once, incrementally, and also can be reassigned to normal operation in a likewise manner. The operator also can simply choose to close some slice offerings when desired and continue to enable only certain higher priority slice(s) for access by premium, or both premium and non-premium used. Further, usage can be selected for an entire preset period or configured for a given duration to select user sets. At step 325, the BW controller adaptor like in FIG. 2, continues to check whether the commercial power has not been restored and, if not, then continues via step 330 with the configured mapped slices selected for reduced power or load operations. At step 335, once the commercial power is resumed or the load is increased beyond a certain threshold, all the slices that have been prior or can be enabled without the prior restrictions will be restored, and normal operations will be restored to all the UE's given access.

Figure 4:
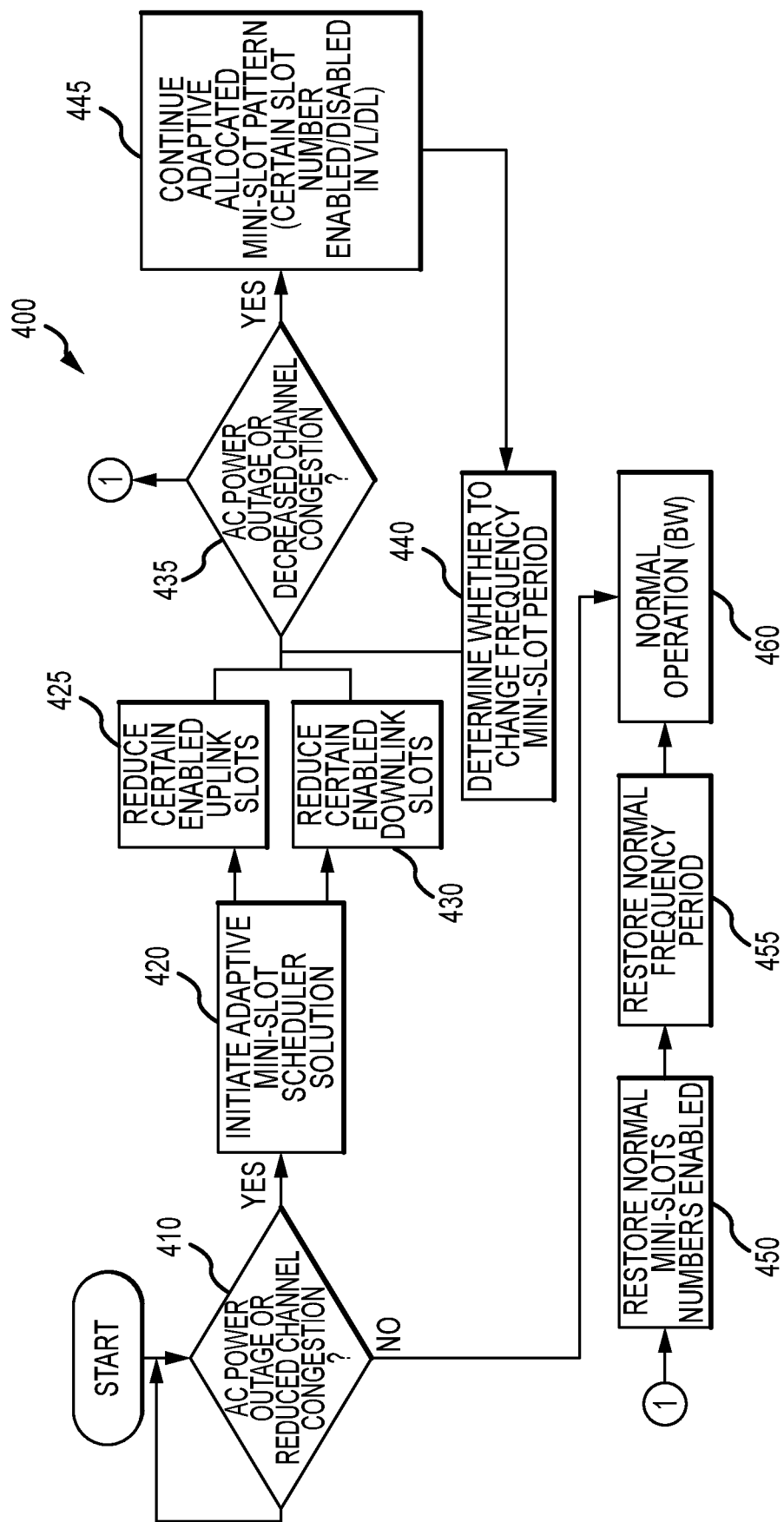
FIG. 4 illustrates a flowchart of an exemplary mini-slot and frequency process responsive to a commercial power interrupt or failure of the base station power management system in accordance with various embodiments.

FIG. 4 illustrates a functional diagram of mini slot configuration before and after a AC power outage of an exemplary smart scheduler for mini-slot allocation and adaptation call-flow in accordance with various exemplary embodiments. In various exemplary embodiments, in FIG. 4 the network 400 in response to an AC power outage or light load at 410 can provide a desired DL/UL transmission pattern to UL and DL requests from various UEs. In FIG. 4, in an exemplary embodiment, there is shown an operating carrier (e.g., 20 MHz) with a default BWP arrangement coupled to a scheduler unit before the AC power outage that schedules data with all the slots enabled for the use of the UE during the initial access for the data allocation by gNB (i.e., RAN+DU/CU). If an AC power outage occurs or there is a light load, and some of the channels are not used, then at 420, the mini-slot algorithm is enabled for enabling and disabling certain mini-slots in a slot configuration period. As mentioned, Mini-slot occupies 2, 4, or 7 OFDM symbols in the normal slot configurations and can assist in achieving low latency in data transmission. The PDSCH channel is used to carry DL user data, and the 5G channel types cover logical channels and transport channels used in uplink and downlink with a mapping between them. In response to the mini-slot scheduling at 420, in the uplink channels at 425, and the downlink channels 430, the number of mini-slots is reduced. Likewise, in the downlink channels, the number of mini-slots can also be reduced. That is, the scheduler only enables certain mini-slots. At 435, once again, the network determines if the AC power outage or light load is continuing. If not, the application reverts back to restore normal slot operation 450, and the mini-slot not enabled, are enabled, and the channel for normal slot operation is restored. By reducing the mini-slot number, reduces the time for the UE to receive a message, and reduces the wait time for transmission (latency receipt and wait times). The UE proportional time in the connected state is reduced after receiving or transmitting the last packet. After this, UE would transition to an idle state, hence the power consumption of the UE is reduced (i.e., a tradeoff of the connection latency time by the UE).

Figure 5:
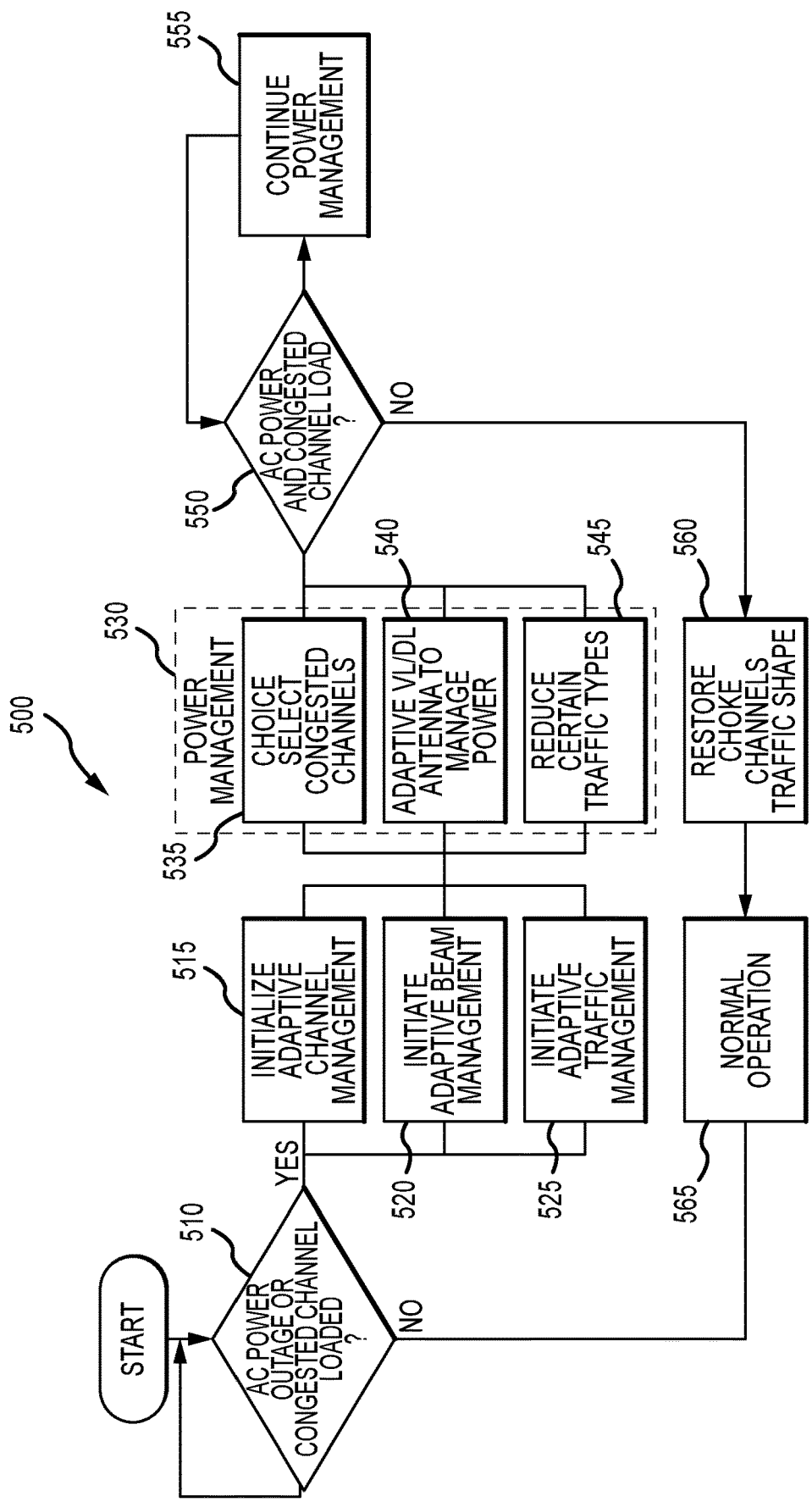
FIG. 5 illustrates a flowchart of an exemplary channel selection and traffic shaping to artificially reduce the total traffic load on the Radio receiver so that not all the TTLs are carrying data in accordance with various embodiments.

FIG. 5 illustrates an exemplary diagram of power management system for choking off active channels, beam management and filtering network traffic by a scheduler and control unit responsive to a power outage detected in a network in accordance with an embodiment.

In various exemplary embodiments, in FIG. 5 the network 500 in response to an AC power outage with/without a set of congested channels at 510 initiates several actions to conserve power at a cell site. For example, the actions may include at 515, initializing an adaptive channel management solution, at 520 initializing at adaptive beam management solution, and at 525 initializing an adaptive network traffic management. Next, the power management actions at 530 include choking select congested channels. The power consumption is reduced by cutting off heavily loaded channels to a limited number of users. Upon a choking off of each channel, a corresponding functional relationship of a reduced amount of power is exhibited and detected by a control unit, or the scheduler, etc. and the choking action of the channels is measured and determined in accordance with the detected power reductions. Hence, rather than applying traffic management to guarantee fairness only amongst user, the traffic management algorithms or solutions will take into account additional consideration such as levels of congestion of network traffic per channel amongst user to reduce power consumption incrementally at the cell site based on each individual channels choked or not enable which in turn can extend backup battery life. Additionally, at 540, the beam management manages power consumption of a set of beams across the cell site (i.e., the power management for the signal to noise ratios) to ensure stable communications of network traffic but also to arrange power supplied to various MIMO system more effectively taking into account the channel choking actions. The MIMO antennas communicate with multiple clients using focused beams of radio waves ("beamforming"). This increases channel efficiency along with data transfer rates and reduces the possibility of interference. The beam management to reduce power needs for the downlink and uplink transmission and reception. Finally, at 545 the network traffic can also be filtered to minimize frame congestions and slot usage, thereby saving power. For example, traffic shaping is implemented that can reduce power consumption at a Base Station by traffic shaping rules to allow real-time voice and video and to block or throttle applications such as P2P, social networks, etc. When channels are not congested, the power consumption is reduced because there is a low traffic rate. This traffic shaping is not particularly effective during high traffic loads because there is throttling back traffic, and certain application use may still not leave empty subframes left to enable a low traffic rate and subsequent lower power consumption. At 550, once again, the network determines if the AC power outage with/without the congested channel traffic is continuing. If not, the application reverts back to restore normal channel and traffic operations 565, and the channels not enabled or choked, are enabled at 560, and any filtered traffic in the traffic shaping steps is no longer subject to such actions.

Figure 6:
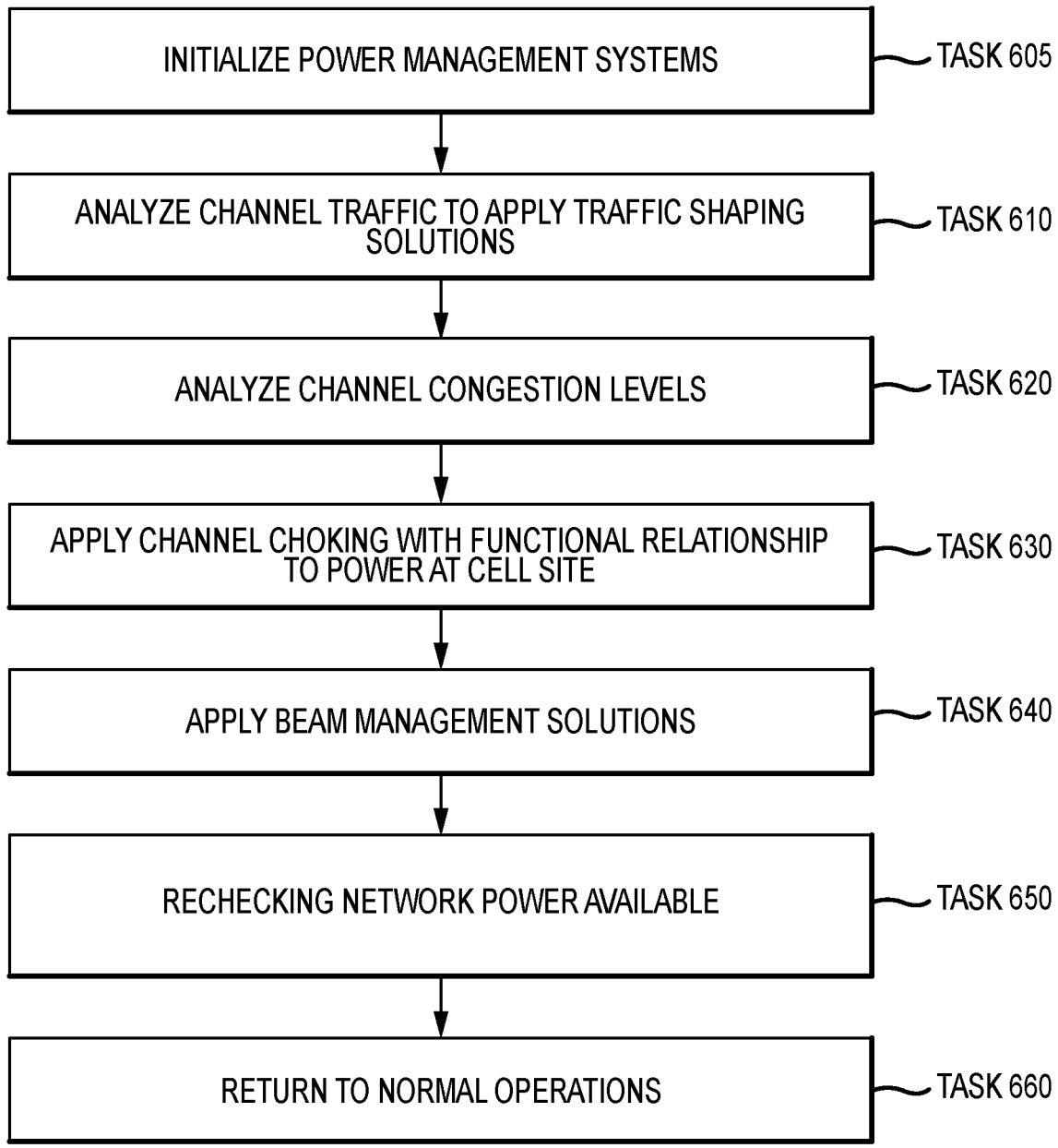
FIG. 6 illustrates an exemplary flowchart of an exemplary channel selection and traffic shaping to artificially reduce the total traffic load on the Radio receiver so that not all the TTLs are carrying data in accordance with various embodiments.

FIG. 6 illustrates an exemplary flowchart of choking channels, traffic shaping, and beam management by a power management system communicating with a scheduler and a control unit to reduce power usage responsive to AC power outages; power interrupts with or without congested channel traffic.

In FIG. 6, at task 605, an AC power outage is detected, or it is determined in response in a variety of ways, for example via feedback (i.e., messages) communicated and received by the Base Station controller of an impending AC power interrupt or AC power outage detected in another part of the network, from the monitoring of the input current to the current Base Station, or from monitoring traffic channel congestion at various slots and mini-slots in use for UL and DL transmissions. In addition, channel congestion is detected or not detected for various channels transmitting data between the cell site and the user. At task 605, the power management systems are initialized. For example, the adaptive channel management system is initialized in response to channel congestion and the power outage. At task 610, traffic shaping management is applied to filter or shape network traffic transmission. For example, the scheduler unit supports low latency and reduced power consumption for each reduced traffic transmission by enabling UL and DL transmissions over variable periods of traffic data sub-frames of each mini-slot based on a set of frequencies where a traffic data sub-frame is a fraction of a series of packet data transmitted in a slot. At task 620, the channels at a cell site are analyzed for congestion levels. Channels will higher levels of congestion are selected in a schema for choking off. At task 630, a channel is choked and a functional relationship is determined for an amount of power that is reduced in the cell site usage as a result of the channel disabling or choking off. In addition, the bandwidth allocated for the other channels and the cell site remains unchanged. Also, users can be moved in schema to other channels from ones that have been choked off. For example, The clients can be moved from one 20 Mhz or 40 Mhz channel to another. At task 640, power levels to the set of beams used for transmission at the cell site are modulated. For example, the channels that are cutoff can cause less traffic and require a lower power level or a change in the operating settings of certain beam sets at the cell site. The signal to noise ratios can be changed or user can be shifted over to different beam frequencies. In addition, by identifying decreases in channel data rates, coordinated control of the power supplied to particular beams can be adjusted while at the same time maintaining a certain level of beam efficacy. Hence, dynamic configure setting for power supplied for beam configurations used for UL and DL transmissions at the cell site to maintain current levels of beam signals across the cell site while reducing power consumed at cell sites of the network. At task 650, the network power level or outage is again rechecked. If network power is restored, then at task 660 the normal operation of the channels is restored. Additionally, any traffic shaping actions for reduced power consumption as well as beam power reductions are also restored to normal operating conditions. During the power outage the initial BWP parts remains the same. That is, the power management system does not change the number of BWP to reduce power consumption across the cell site but reduces the number of channels thereby maintain at least the same bandwidth of the selected channels that are not choked off.

Figure 7:
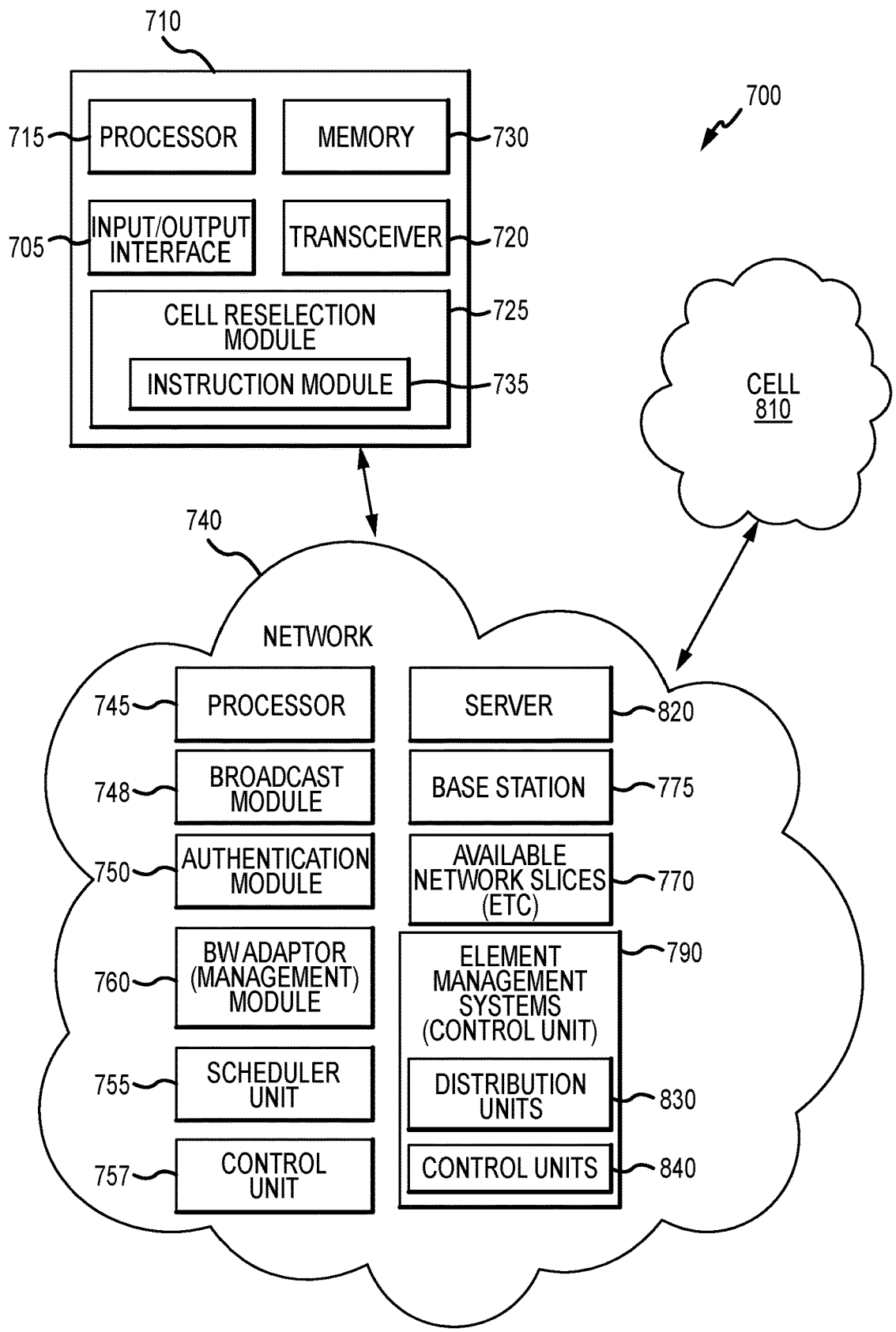
FIG. 7 illustrates a diagram of an example of user equipment (UE) and network architecture, for example, an automated process for reducing power consumption in accordance with various embodiments.

FIG. 7 is an exemplary illustration of a UE and network configuration in accordance with an embodiment. The UE 710 includes a processor 815 for performing various logic solution functions for registering and receiving broadcast system information, initiating PDU sessions performing cell selections and reselections, ranking neighboring cells, configuring different modes of operation of the UE, etc. . . . . The UE 710 may include a cell reselection module 725, input/output interfaces 705, memory 730 for storing measurement reports, rankings data of neighboring cells, and a measurement module 735 for calculating by various solutions distances and other criteria for neighboring cells, etc. and for accessing cells within the vicinity for the premium and non-premium users. The network 740 may include a base station 775, processor 745 for registering UE for slice access, cell ID modules 755, broadcast module 748 for broadcasting slice ID, slice offset values for neighboring cells and other system information, authentication module 750 for authenticating a UE, network slices 770, etc. and a BW adaptation module 760. The UE 710 communicates with the network and reads broadcasted system information at a cell 810 in which the UE 810 is camped in an idle mode. For example, if the UE 710 is camped at a cell A, then the UE 710 would receive slice IDs and slice offset values for neighboring cells of cell A via the transceiver 720 and process the information via the processor 715 to perform measurements and calculate using cell reselection equations of the cell reselection module 725 (e.g., using a cell reselection logic or process) to select a next cell where the cell reselection process is based on a ranking of the neighboring cells.

The scheduling unit 755 can communicate a control unit 757, and a BW adaptation module 760, etc. . . . via element management systems (EMS) 790 (i.e., or alternate control units) to direct various logic components in channel management and the control unit 757 in traffic shaping and beam management. In addition, the control unit 757 with the scheduling unit 755 can perform actions for allocating channels, allocating beams, filtering network traffic, allocating slots, mini-slots and setting mini-slot configuration periods across channels by managing a set of frequency settings by an automated workflow of the cell 810 of the parts (shown in FIG. 1) of the radio receiver, the UPS, battery circuit (i.e., DC power supply), the cell site (i.e., node) calls/dropped calls/throughput in operation, the server. The EMS 790 monitors via the distribution units (DUs) 830 and the central units (CUs) 840 the various nodes and cells in the network and controls or send instructions to the various components of the cell 810 to maintain the quality of service (QoS) of the cell site. The automated workflow maintains the network availability and monitors the status of network devices, including the commercial power supplied to the network. The EMS 790 can also be connected to multiple eNodeB for power management. When an AC power outage in the network occurs, the automated workflow which is monitoring the network instructs the EMS 790 via various logic components to reduce the output power of the radio receiver and also takes into account other factors by communicating with the radio receiver, cell site via a router (or another communication link) connected to the server 820 in reducing the output power for transmission. This, in turn, reduces the DC power and the draw on the UPS.

In an exemplary embodiment, the server 820 can be configured as NB-IoT Server is a software for data collection and monitoring and communicating via the router for activating the automated workflow via the EMS 790 and can display the log messages of each base station and the survival status of all sessions (including information such as signal, power, etc.).

After the detection of an interrupt of the commercial power, power failure, power loss, and/or AC power outage of the network, the automated workflow, which is monitoring the components and the network, detects the change and the power loss. The automated workflow in response to the detected power loss implements the configuration management functions via the scheduling unit 755 for mini-slot allocations and frequency settings, the BW adaptation module 760 of slice assignments, and available BWPs at the cell 810. The EMS 890 communicates with the radio receiver, the server 820, and other components associated with the cell site, to send messages via the cell site router to receiver collect cell statistics, and to execute appropriate plug and play functionality of the base station radio receiver. The automated workflow executes various functions to the element management system based on decisions from the BW adaptation module 760 and data from the cell site and base station.

As described, a power management system includes several data processing components, each of which is patentable, and/or have patentable aspects, or having processing hardware capable of performing automated processes that are patentable. This document is not intended to limit the scope of any claims or inventions in any way, and the various components and aspects of the system described herein may be separately implemented apart from the other aspects.

The invention claimed is:

1. A system for adaptive channel and traffic shaping management in a network, comprising:
 a cloud-based network base station configured with a set of components hosted in a cloud server comprising a control unit, a scheduler unit, a bandwidth adaptation unit, and a set of distribution and central units (DU/CU) in communication with a network of base station controllers associated with a plurality of cell sites to monitor at least data traffic and power usage at each cell site and to coordinate availability of bandwidth by the bandwidth adaptation unit to each of the cell sites based on at least the data traffic and power usage at each cell site by data received from each cell site base station controller;
 wherein the cloud-based network base station implements the scheduler to support conditions for low latency and reduced power consumption at each cell site in the network by data received from the DU/CU that monitor power and channel traffic conditions at the plurality of cell sites in the network;
 wherein cloud-based network base station implements the scheduler unit to coordinate scheduling for transmitting and receiving data traffic data of user equipment (UE) wherein the scheduler unit is configured to:
  receive control data about congested network channels in Uplink (UL) and downlink (DL) transmissions from the UE; and
  apply a schedule schema in response to levels of traffic congestion from the control data at a cell site to choke off congested channels based on the control data about traffic data amounts on a channel;
 wherein the cloud-based network base station further implements the control unit in communication with the scheduler unit in response to the level of traffic congestion to manage network traffic at each cell site, wherein the control unit is configured to:
  apply an adaptive traffic scheme to allocate bandwidth and to shape network data traffic on select channels based on the control data wherein the control data comprises data of traffic type on the channel; and
  iteratively apply the adaptive traffic scheme on the select channels in response to levels of traffic at the cell site based on data received by the DU/CU of the power and channel traffic condition.

2. The system of claim 1, further comprising:
 the cloud-based network base station implements the control unit to apply adaptive beam management solutions to reduce power at the cell site, wherein the control unit configured to:
  dynamic configure setting for power supplied for beam configurations used for UL and DL transmissions at the cell site to maintain current levels of beam signals across the cell site while reducing power consumed at cell sites of the network.

3. The system of claim 2, further comprising:
 the cloud-based network base station implements the scheduler unit to implement a time-domain based schedule to reduce power consumption in the UL and DL transmissions by reducing amounts of network traffic by the scheduler unit applying a set of time-domain scheduling periods for scheduling of the network traffic on the channel.

4. The system of claim 3, further comprising:
the cloud-based network base station implements the scheduler unit to use a certain number of OFDM symbols to manage network traffic on congested channels by instructing the scheduler unit to schedule a dynamic set of mini-slots to send and receive data requests in scheduled operations.

5. The system of claim 4, further comprising:
the cloud-based network base station implements the control unit to maintain a same active bandwidth prior to a power outage for select channels not subject to choke operations at the cell site.

6. The system of claim 5, wherein the reduced traffic comprises mini-slot length for a mini-slot configuration period of UL and DL transmissions comprises 2, 4, and 8 OFDM symbols.

7. The system of claim 6, further comprising:
the cloud-based network base station implements the scheduler unit to support low latency and reduced power consumption for each reduced traffic transmission by scheduling UL and DL transmissions over variable periods of traffic data sub-frames of each mini-slot based on a set of frequencies wherein a traffic data sub-frame is a fraction of a series of packet data transmitted in a slot.

8. The system of claim 7, further comprising:
the cloud-based network base station implements the control unit to reduce power consumption at a cell site by performing one or more actions of a set comprising choking congested channels, adapting beam management, and filtering network traffic at the cell site.

9. The system of claim 8, further comprising:
in response to ongoing traffic transmissions, the cloud-based network base station implements the scheduler unit to preempt an already ongoing sub-frame data-based transmission for other UEs at the cell site to enable immediate transmission of sub-frame data at low latency on less congested channels to decrease amounts of power drawn by the cell site.

10. The system of claim 9, further comprising:
in response to power detected, the cloud-based network base station implements the control unit to restore a priority scheme for choked channels and traffic shaped by control and filtering actions.

11. A method for adaptive channel and traffic shape management, comprising:
configuring a cloud-based network base station with a set of components hosted in a cloud server comprising a control unit, a scheduler unit, a bandwidth adaptation unit, and a set of distribution and central units (DU/CU) in communication with a network of base station controllers for associating with a plurality of cell sites for monitoring at least data traffic and power usage at each cell site and for coordinating availability of bandwidth by the bandwidth adaptation unit to each of the cell sites based on at least the data traffic and power usage at each cell site by data received from each cell site base station controller;
implementing the scheduler unit by the cloud-based network base station for supporting conditions of low latency and reduced power consumption at each cell site based on data received from DU/CU that monitors power usage and channel traffic at the plurality of cell sites in the network;
transmitting and receiving by the scheduler unit configured with the cloud-based network base station, data of levels of channel traffic data of user equipment (UE);
receiving control data, by the scheduler unit configured with the cloud-based network base station, about congested network channels in Uplink (UL) and downlink (DL) transmissions from the UE;
applying a schedule scheme in response to levels of traffic congestion from the control data, by the scheduler unit configured with the cloud-based network base station, at a cell site to choke off congested channels based on a control data about traffic data amounts on a channel;
applying, by a control unit configured with the cloud-based network base station, and in communication with the scheduler unit, the schedule scheme in response levels of traffic from the control data to manage network traffic at the cell site, and applying adaptive traffic schema to shape network data traffic on select channels based on a control data of traffic type on the channel; and
iteratively applying, by the control unit configured with the cloud-based network base station, the adaptive traffic schema on the select channels in response to levels of traffic at the cell site based on data received by the DU/CU of the power usage and channel traffic condition.

12. The method of claim 11, further comprising:
applying, by the control unit configured with the cloud-based base station, adaptive beam management solutions to reduce power at the cell site, dynamically configure setting for power supplied for beam configurations used for UL and DL transmissions at the cell site to maintain current levels of beam signals across the cell site while reducing power consumed at cell sites of the network.

13. The method of claim 12, further comprising:
implementing, by the scheduler unit configured with the cloud-based base station, a time-domain based schedule to reduce power consumption in the UL and DL transmissions and reducing amounts of network traffic by applying a set of time-domain scheduling periods for scheduling of the network traffic in a channel.

14. The method of claim 13, further comprising:
scheduling, by the scheduler unit configured with the cloud-based base station, a certain number of Orthogonal Frequency-Division Multiplexing (OFDM) symbols for enabling mini-slots composed of subframe data when implementing send and receive data requests in scheduling operations.

15. The method of claim 14, further comprising:
maintaining, by the control unit configured with the cloud-based base station, a same active bandwidth prior to a power outage for select channels not subject to choke operations at the cell site.

16. The method of claim 15, wherein a mini-slot length for a mini-slot configuration period of UL and DL transmissions comprises 2, 4, and 8 OFDM symbols.

17. The method of claim 16, further comprising:
enabling, by the scheduler unit configured with the cloud-based base station via the schedule scheme, low latency and reduced power consumption for each reduced traffic transmission by enabling UL and DL transmissions over variable periods of traffic data sub-frames of each mini-slot based on a set of frequencies wherein a traffic data sub-frame is a fraction of a series of packet data transmitted in a slot.

18. The method of claim 17, further comprising:

in response to a DL transmission, preventing by the scheduler unit configured with the cloud-based network base station, enablement of at least one set of mini-slots to receive DL transmissions outside an active bandwidth part via the schedule scheme; and in response to a UL transmission, preventing by the scheduler unit configured with the cloud-based network base station, enablement of at least one set of mini-slots to receive UL transmissions outside the active bandwidth part.

19. The method of claim 18, further comprising:

implementing a power management scheme, by the control unit configured with the cloud-based network base station, by one or more actions of a set of actions associated with reducing power consumption at the cell comprising choking congested channels, adapting beam management, and filtering network traffic at the cell site.

20. A computer program product tangibly embodied in a computer-readable storage device that stores a set of instructions that when executed by a processor perform a method for an operational mode of a cloud-based network base station when a power loss with congested traffic in channels at cell sites are detected, the method comprising:

configuring a cloud-based network base station with a set of components hosted in a cloud server comprising a control unit, a scheduler unit, a bandwidth adaptation unit, and a set of distribution and central units (DU/CU) in communication with a network of base station controllers for associating with a plurality of cell sites, for monitoring at least data traffic and power usage at each cell site, and for coordinating availability of bandwidth by the bandwidth adaptation unit to each of the cell sites based on at least the data traffic and power usage at each cell site by data received from each cell site base station controller;

implementing the scheduler by the cloud-based network base station for supporting conditions for low latency and reduced power consumption at each cell site in the network based on data received from the set of DU/CU for monitoring power and channel traffic at the plurality of cell sites in the network;

transmitting and receiving by the scheduler unit configured with the cloud-based network base station, data of levels of channel traffic data of user equipment (UE);

receiving control data, by the scheduler unit configured with the cloud-based network base station, about congested network channels in Uplink (UL) and downlink (DL) transmissions from the UE;

applying a schedule scheme in response to levels of traffic congestion from the control data, by the scheduler unit configured with the cloud-based network base station, at a cell site to choke off congested channels via a schedule scheme based on a control data about traffic data amounts on a channel;

applying, by a control unit configured with the cloud-based network base station, and in communication with the scheduler unit, the schedule scheme in response levels of traffic from the control data to manage network traffic at the cell site, and applying an adaptive traffic scheme to shape network data traffic on select channels based on a control data of traffic type on the channel; and iteratively applying, by the control unit configured with the cloud-based network base station, the adaptive scheme on the select channels in response to levels of traffic at the cell site based on data received by the DU/CU of the power and channel traffic condition.

* * * * *